United States Patent [19]

Piquilloud

[11] 4,153,750

[45] May 8, 1979

[54] FLOOR AND/OR WALL COVERING

[75] Inventor: Pierre C. Piquilloud, Saint-Cloud, France

[73] Assignee: Sommer Exploitation, Neuilly sur Seine, France

[21] Appl. No.: 900,228

[22] Filed: Apr. 26, 1978

[51] Int. Cl.² .................... B32B 5/06; B32B 5/08; B32B 5/12; B32B 31/16

[52] U.S. Cl. .................... 428/107; 156/85; 156/148; 428/110; 428/113; 428/114; 428/235; 428/284; 428/300

[58] Field of Search ........... 156/85, 148; 428/107, 428/110, 113, 235, 284, 300, 114

[56] References Cited

U.S. PATENT DOCUMENTS

| | | | |
|---|---|---|---|
| 2,266,761 | 12/1941 | Jackson et al. | 428/107 |
| 2,434,532 | 1/1948 | Wurzburger | 428/107 |
| 2,537,323 | 1/1951 | Wurzburger | 428/107 |
| 3,307,990 | 3/1967 | Homier et al. | 428/235 |
| 3,307,992 | 3/1967 | Condon et al. | 428/107 |
| 3,819,461 | 6/1974 | Saffadi | 428/107 |
| 3,822,173 | 7/1974 | Graber et al. | 428/300 |
| 3,937,861 | 2/1976 | Zuckerman et al. | 428/300 |
| 4,016,319 | 4/1977 | Marshall | 428/113 |

FOREIGN PATENT DOCUMENTS 5762 of 1897 United Kingdom ............ 428/110

*Primary Examiner*—J. C. Cannon

[57] ABSTRACT

The invention relates to a floor and/or wall covering, its manufacturing process, as well as to an installation for performing this process.

It specifically relates to a non-woven floor and/or wall covering having at least one layer of parallel juxtaposed textile threads and a supporting layer to which are individually fixed various textile threads.

Particular applications of the invention are to all types of floor and wall coverings and to furnishing fabrics.

12 Claims, 5 Drawing Figures

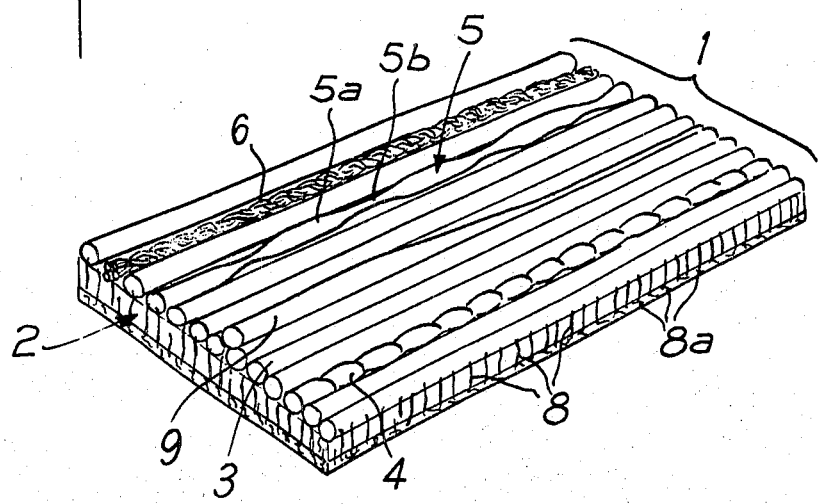
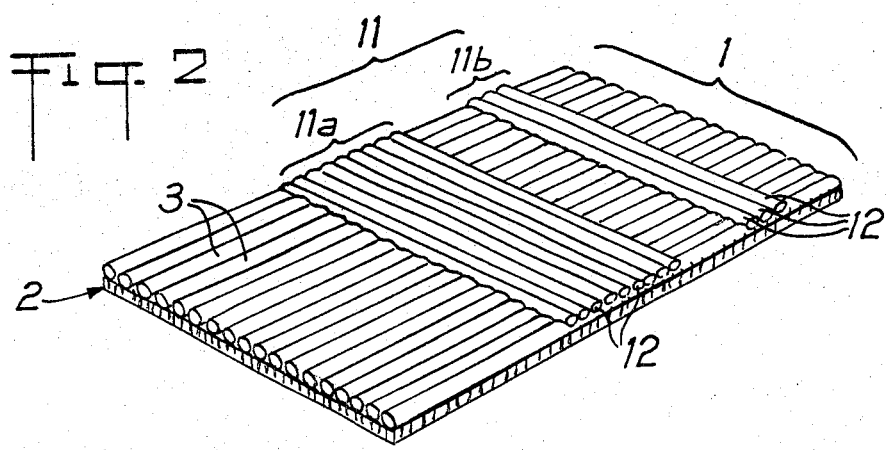
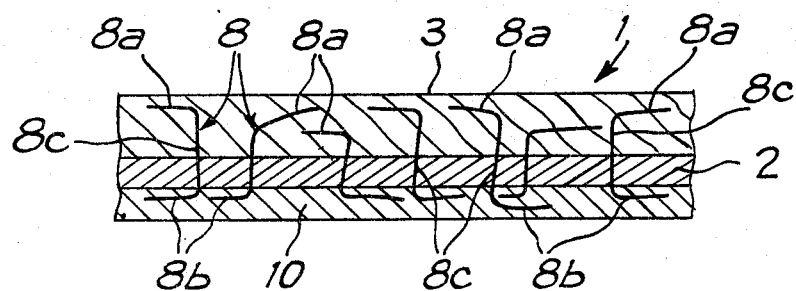

FLOOR AND/OR WALL COVERING

BACKGROUND OF THE INVENTION

The present invention relates to a floor and/or wall covering, its production process and an installation for putting the said process into effect.

More specifically, the invention relates to a floor and/or wall covering of the non-woven type and comprising at least one layer or web of parallel juxtaposed textile threads, as well as a supporting layer to which are individually fixed the different textile threads.

Hitherto the textile threads have been fixed by means of an appropriate glue or cement on the one hand, or a Malimo-type tack or stitch using a sewing thread for fixing the textile threads to the supporting layer on the other.

When the textile threads are glued to their support, the diameter of the said threads cannot be very large because the glued portion of the thread must be both relatively large relative to the unglued surface, but at the same time must stay sufficiently small so that the textile threads are not rigidified to too great an extent by the hardened glue, retaining on the visible side of the covering their textile feel and appearance. It has been found that this double requirement can only be satisfied by very thin threads so that the scope of application of the known covering of this type is limited to vertical panels and walls. Moreover, the glue used in these coverings is often a thermoplastic film which is integral with a sheet of paper which is heated to its softening temperature before applying the layer of textile threads thereto by pressure, and which loses its pliability relatively quickly and becomes rigid in such a way that the threads can easily be pulled out, whereby the covering deteriorates in a short time. During the manufacture of such a known covering, it is necessary to ensure that the textile threads are located in the same plane and can come into contact with the supporting layer covered with a film of glue because any textile thread located outside the thread layer plane cannot be fixed to its support. When large threads are used there is a danger of them being flattened during their application to the adhesive layer, and also of them being glued over a portion of the periphery thereof which is inadequate for preventing their premature pulling out. Analogous difficulties occur with twisted threads, layered threads and any other so-called fancy thread.

Attempts have already been made to obviate these disadvantages by using for the fixing of the large threads fine tacking or stitching threads inserted by means of a Malimo-type loom in such a way as to surround the visible side of the periphery of the threads and fix the said threads to the supporting layer. To the extent that the large threads are all of the same colour, the tacking thread can also be of the same colour so that the appearance of the covering is not impaired by the said tacking thread. However, the aesthetic appearance is impaired when the large threads are of different colour to one another and are fortiori different from the tacking thread colour. Quite apart from this disadvantage of an aesthetic nature, the covering of this known type cannot withstand intensive wear because the fine tacking thread is relatively weak and the large threads can be removed from their housing when no longer held in place by the tacking thread. Moreover, the weakness of the tacking thread prevents any usage of this type of covering as a floor covering.

To obviate this disadvantage, it has been proposed to cover the layer of large threads and the tacking threads with a plastic protective layer. However, this means that the covering no longer has the basic textile characteristics such as a soft and pliable feel which are absolutely necessary in a textile floor and/or wall covering.

BRIEF SUMMARY OF THE INVENTION

The invention proposes to eliminate all the above disadvantages and provide a covering of the type indicated hereinbefore which completely retains its textile characteristics whilst having a great resistance to wear and fraying whilst permitting the use of a fancy threads.

According to the invention, this is achieved by means of a floor and/or wall covering of the non-woven type comprising at least one layer of parallel juxtaposed textile threads, as well as a supporting layer to which are individually fixed the said textile threads formed from a plurality of more or less twisted fibres wherein the textile threads have a diameter of at least 1 mm and said twisted fibres have a diameter of at most 0.1 mm, wherein a small portion of the fibres of each textile thread is fixed to the supporting layer by low density needling without destroying the continuity and the initial appearance of each textile thread, wherein each of the fixing fibres have two end portions disposed more or less parallel to said supporting layer and a middle part extending transversely to said supporting layer, one of said end portions being frictionally attached to the other fibres of the corresponding textile thread and the other end portion being embedded in a coating applied to the back of said supporting layer.

As a result of this measure all the textile threads are fixed to their supporting layer along the entire contact face thereof with the supporting layer without the fixing fibres being visible or exposed to any wear and without getting a sticking or hardened product surface. The large threads retain their swelling and puffed out form and because the coating is disposed on the back side of the supporting layer because the low intensity needling hardly modifies their structure. Moreover, superimposed threads are fixed without difficulty to the supporting layer.

It has been found that in conjunction with the supporting layer the fixing fibres prevent the other fibres which are helically wound to a more or less pronounced degree about the thread axis from unwinding and opening in such a way that the wear and abrasion resistance of the covering is greatly increased. This is due to the fact that the invention advantageously combines the strength characteristics of a textile thread due both to the torsion and the adhesion of the fibres relative to one another, and to the tangling of the fibres due to needling, as well as to the locking of the twisted fibres by the needled fibres whilst ensuring a fixing of the threads to the supporting layer at numerous points. In view of these characteristics the covering according to the invention can be used as a floor covering and at the same time for a given wear resistance requires less textile material than other textile coverings such as needled carpets, velvet carpets etc.

According to the process of the invention, at least one layer of juxtaposed textile threads and one supporting layer are prepared and the said layers are introduced into a needling machine where the threads of the textile thread layer are fixed to the supporting layer by relatively low density needling operation, so that a small portion of the fibres of each textile thread has one of its end portions extending through and beyond said supporting layer and the other end portion still remaining within the fibre-assembling forming said textile thread and wherein the fibre end portions extending beyond said supporting layer are bent parallel to said layer and are recovered and embedded in a coating applied to the back side of said supporting layer.

The installation for putting into effect the said process comprises at least one spool support whose different threads spools are used to form a layer of juxtaposed parallel threads, a guidance card for the different threads of the said layer, a supporting roller for a strip constituting the supporting layer for the thread layer, a needling machine positioned downstream of the card, and optionally one or more return and guidance cylinders or rollers for the thread layer and/or for the support layer, whereby the said cylinders or rollers are positioned upstream of the needling machine intake.

BRIEF DESCRIPTION OF THE DRAWINGS

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used, and structural changes may be made as desired by those skilled in the art without departing from the present invention and the scope of the appended claims. In the drawings show:

FIG. 1 is a perspective view of a first embodiment of the floor and/or wall covering according to the invention;

FIG. 2 is a perspective view of a second embodiment of the covering according to the invention;

FIG. 3 is a longitudinal section in accordance with FIG. 1;

FIG. 4 is a schematic side view of the installation according to the invention;

FIG. 5 is a plan view of the installation according to FIG. 4.

DETAILED DESCRIPTION OF THE PREFERRED EMBODIMENTS

The floor and/or wall covering substantially comprises a layer or web of textile threads 1 and a supporting layer 2, to which is fixed each textile thread 3 of the said layer 1. The thickness of the supporting layer 2 can be larger or smaller than the thickness of layer 1 whose threads 3 are preferably large threads with a diameter of at least one millimeter and preferably of a few millimeters. The external configuration of these threads differ and as an example 4 designates a twisted thread, 5 a burled thread where wide portions 5a and narrow portions 5b alternate, and by 6 a braided thread formed from several thin threads.

The basic threads used within the scope of the present invention all comprise a plurality of synthetic or natural fibres which have a diameter of at most 0.1 mm, which are approximately parallel to one another and which are wound or twisted in a more or less pronounced degree about the thread axis. The threads 3 to 6 are fixed to the supporting layer 2 by means of certain fibres 8 of each thread 3 to 6, whereby the said connecting fibres 8 being partly embedded in the supporting layer 2 by means of a relatively low density needling operation. It has been found that a needling density of twice 84 stitches/dm$^2$ of covering surface is completely adequate for a good fixing of threads 3 to 6 to their supporting layer. Good results have been obtained with needling densities between 30 and 600 stitches/dm$^2$.

Obviously these values vary as a function of the type and length of the fibres forming threads 3 to 6. Moreover, the needling density limit must not be exceeded because beyond this limit the threads are destroyed. In FIG. 1 reference numeral 9 designates a thread in a partly faulty position despite which, this thread 9 which is substantially raised relative to the layer of the threads 1 is purposely fixed to the supporting layer 2 by means of the connecting fibres 8 which connect it to the latter via the layer of threads 1.

The connecting fibres 8 remain by one of their ends, that is the wound or twisted end 8a, to a large extent in the structure of thread 3 to 6 and pass by their other end 8b through the supporting layer 2 in which their middle part 8c is embedded by a conventional needling operation. The length of the fibres 8 is such that at least the remaining twisted end 8a has a length assuming a good friction connection with the other fibres of the thread and that the other end 8b has a length of at least some millimeters.

The supporting layer 2 can comprise a strip of paper or non-woven material obtained by the wet method, a non-woven material with continuous layered and needled threads, a polypropylene or polyester film, a cloth, a knitted fabric or the like. The ends 8b of the connecting fibres 8 project from the supporting layer 2 on the side opposite to that of the layer of fibres 1 is more or less bent so as to extend approximately parallel to the supporting layer 2 and is embedded in or recovered by a, for example, thermoplastic coating 10 applied in the fluid state to the back of supporting layer 2 (FIGS. 1 and 3). In this way, the roots or bent end parts 8b of the connecting fibres 8 are firmly retained in said coating 10 or sticked against the back of the supporting layer 2. As the middle part 8c of each connecting fibre 8 extends through the supporting layer 2 in a substantially perpendicular manner and as the twisted end 8a of the fibres 8 is disposed parallel to said supporting layer 2 as like as the bent end 8c, each connecting fibre 8 presents a configuration of a U, S or Z (see FIG. 3). The wound or twisted end 8a of each connecting fibre 8 is attached to the adjacent fibres of the textile thread 3 by the twist of said thread and by the adhesive forces of the fibres in contact one with the other.

Threads 3 to 6 forming the layer of threads 1 can all have the same diameter or be of a different diameter, whereby groups of threads of one diameter can alternate with groups of threads of a different diameter.

It is also possible to form the layer of threads from groups of threads of different types and configurations. The type of threads 3 to 6 used is adapted to the intended use of the floor and/or wall covering. They can be fibres of foil, cotton, sisal, coir or synthetic fibres etc. Thus, for example, sisal fibres can be transformed into threads, cords or braids which will then be used to form the layer of threads for plaiting.

Even if in the embodiment of FIG. 1 threads 3 to 6 of layer 1 are arranged parallel to the longitudinal extension of supporting layer 2 of the floor or wall covering, it is also possible to arrange them in the first layer or in the second layer of threads 11 so as to be perpendicular to the longitudinal extension of the said layer 2. The second layer of threads 11 is not necessarily continuous but on the other hand can be discontinuous and vary in its width. The threads 12 of the second layer 11 are parallel to one another and are fixed by needling at least to the threads 3 of the first layer of threads 1 and preferably also to the supporting layer 2. In order to facilitate the fitting of the second layer of threads called transverse layer 11, advantageously an assembly of the thread layer and supporting layer is formed as shown in FIG. 1 in which the threads are parallel to the longitudinal extension of the supporting layer which in this particular case preferably comprises an extremely thin transparent plastic film or strip constituting a provisional supporting strip. The film width then determines the width of the different portions 11a, 11b of the second layer of threads 11. In place of a thermoplastic film it is also possible to use a thin non-woven material strip, e.g. obtained by the wet method from fibres whose composition is analogous or identical to that of the large threads of the layer of textile threads 11. Instead of arranging portions 11a, 11b of the second layer of threads 11 transversely relative to threads 3 of the first layer of threads 1, they can actually be placed on the latter in such a way that the threads 12 grouped into several columns are parallel to the threads 3 of the first layer and thus form raised columns of varying widths. It is obviously impossible to envisage other arrangements of the threads of the second layer 11 relative to those of the first layer 1 without passing beyond the scope of the present invention.

FIGS. 4 and 5 schematically show an embodiment of an installation for the manufacture of the textile floor and/or wall covering. The threads 3 which will form the layer of threads 1 or 11 are stored in the form of spools 14 mounted on a spool support 15 and pass between the teeth 16 of a guidance card or comb 17 before passing below a guidance roller 18 which applies the layer of threads 1 or 11 to a supporting layer 2 coming from a supporting roller 19 and passing like the layer of threads 1 above a further guidance roller 20 before entering, together with the layer of threads 1 or 11, into the working area 21a of a needling machine 21 which is defined by the anvil plate 22 and the vertically movable head 23 (in accordance with the double arrow F) of the said needling machine 21. Obviously the needling machine 21 is of conventional design except that the number of needles, 24 per cm² of the working area is relatively low. The needles 24 are preferably of the forked type and have a smooth shank. The gap between the two branches of the needle fork is relatively small so that the number of fibres seized and driven through the supporting layer 2 per active stroke of the needle is relatively small. The covering which comprises a supporting layer 2 and a layer of threads 1 fixed to the said layer 2 on leaving the needling machine 21 is spooled onto a storage roller 25. Prior to this spooling operation the covering can obviously be provided with a coating 10 on the back of the supporting layer (FIGS. 1 and 3).

The second layer of threads 11 can be placed on the first layer of threads 1 in several ways, but advantageously the second layer of threads 11 is initially produced with an installation such as that shown in FIGS. 4 and 5 and is fixed provisionally and preferably by needling to a very thin supporting strip such as a thermoplastic film or a non-woven strip obtained by the wet method and whose fibres have an analogous or identical composition to that of the threads 12 of the second layer 11. The threads 12 are positioned parallel to the longitudinal extension of the provisional supporting strip of the second layer of threads 11 and can then be either arranged parallel or transversely relative to threads 3 to 6 of the first layer 1 for producing the covering. If it is decided to position the threads 12 of the second layer 11 parallel to those of the first layer 1, one or several rolls of the second layer-supporting strip assembly is positioned above the first layer 1 and the supporting roll 19 as shown by dotted lines in FIG. 4 and designated by reference numeral 26, whereby a return roller 27 brings the said assembly into contact with the first layer 1. The threads 12 of the second layer 11 can be collected together into several groups which are spaced in the transverse direction of the first layer 1 in such a way as to form on the latter groups or columns of raised threads relative to those of the first layer 1. If it is desired to arrange the threads 12 of the second layer of threads 11 transversely to those of the first layer 1, one or several rolls 28 of the second layer-supporting strip assembly are provided preferably upstream of the needling machine 21 and on one side of the conveying path of the supporting layer 2, whilst adjacent to the said conveying path of the assembly of the first layer 1 and the supporting layer 2, namely between the latter and the roller or rollers 27 are provided a cutting device 29, and on the other side of the said conveying path a traction device schematically shown at 30 and permitting the removal from roller 28 of a new portion of the second layer after previously cutting a length substantially equal to the width of the first layer 1. The different portions of the second layer 11 with threads 12 arranged transversely to those of the first layer 1 can be placed on the first layer 1 either in contiguous manner or in such a way as to leave gaps between the forward travel direction of the first layer in the direction of the needling machine 21. In the case where a second layer of threads 11 has to be needled to the supporting layer simultaneously with the first layer of threads, the stroke height of the needling machine head 23 is regulated so that the lower end of the needles 24 can pass through the assembly comprising first and second layers of threads and the supporting layer.

The manufacturing process for the covering can be gathered from the above explanations so that it is unnecessary to describe it further in detail.

Obviously the embodiments described hereinbefore can be modified without passing beyond the scope of the invention as defined by the attached claims. Thus, it is possible to use as threads for forming at least partly the layer of threads chenilles which are well-known in the manufacture of thick pile carpets. It is known that these chenilles are obtained from a preparatory fabric formed from on the one hand warp threads serving as chenille binding threads and on the other of weft threads serving as velvet or wool threads. The weft threads, for example large woollen threads of the said preparatory fabric are then cut between each binding warp, whereby the rows of thus formed weft threads are called "chenilles". Depending on whether the V-shaped weft thread strands are folded or not, so-called flat or so-called round chenilles are obtained. These chenilles are needled to the supporting layer preferably only in the binding area of the weft thread strands with the binding warp threads. Moreover, it is possible, for example, to use a shrinkable textile fabric as the supporting layer e.g. a cotton fabric, and then subject the same to a shrinking treatment after having fixed thereto by needling the threads of the layer of threads. This further secures the fibres embedded in the supporting layer by needling and increases their resistance to pulling out. In addition, the use of the covering is not limited to floors and/or walls and can, for example, be used for furnishing fabrics.

What is claimed is:

1. A floor and/or wall covering of the non-woven type comprising at least one layer of parallel juxtaposed textile threads, as well as a supporting layer to which are individually fixed the said textile threads formed from a plurality of more or less twisted fibres, wherein the textile threads have a diameter of at least 1 mm and said twisted fibres have a diameter of at most 0.1 mm, wherein a small portion of the fibres of each textile thread is fixed to the supporting layer by low density needling without destroying the continuity and the initial appearance of each textile thread, wherein each of the fixing fibres have two end portions disposed more or less parallel to said supporting layer and a middle part extending transversely to said supporting layer, one of said end portions being frictionnally attached to the other fibres of the corresponding textile thread and the other end portion being embedded in a coating applied to the back of said supporting layer.

2. A floor and/or wall covering according to claim 1, wherein the threads of the layer of threads have different diameters and are grouped so that threads of one diameter alternate with groups of threads of different diameters.

3. A floor and/or wall covering according to claim 1, wherein the threads of the layer of threads comprise groups of threads of different types.

4. A floor and/or wall covering according to claim 1, wherein the threads of the layer of threads comprise threads of different configurations.

5. A floor and/or wall covering according to claim 1, wherein the textile threads at least partly comprise chenilles whose cut threads forming the weft are needled to the supporting layer in the binding area with the chenille binding threads forming the warp.

6. A floor and/or wall covering according to claim 1, wherein it comprises two layers of threads the second at least partly covering the first layer of threads, and wherein the threads of the second layer are connected to the supporting layer by connecting fibres from the threads and embedded in the said supporting layer by needling.

7. A floor and/or wall covering according to claim 6, wherein the threads of the second layer of threads are arranged on the first layer of threads in spaced groups.

8. A floor and/or wall covering according to claim 6, wherein the threads of the second layer of threads extend parallel to those of the first layer of threads.

9. A floor and/or wall covering according to claim 6, wherein the threads of the second layer of threads extend transversely to those of the first layer of threads.

10. A floor and/or wall covering according to claim 6, wherein the threads of the second layer of threads are fixed to a provisional supporting strip.

11. A manufacturing process for a floor and/or wall covering according to claim 1, wherein the threads of the layer of threads are applied to the supporting layer by a relatively low density needling operation, so that a small portion of the fibres of each textile thread has one of its end portions extending through and beyond said supporting layer and the other end portion still remaining within the fibre-assembling forming said textile thread and wherein the fibre end portions extending beyond said supporting layer are bent parallel to said layer and are recovered and embedded in a coating applied to the back side of said supporting layer.

12. A manufacturing process according to claim 11, wherein the supporting layer comprises a shrinkable textile fabric which undergoes a shrinking treatment after fixing the threads of the layer of threads thereto by needling.

* * * * *